US008233153B2

(12) United States Patent
Knüttel

(10) Patent No.: US 8,233,153 B2
(45) Date of Patent: Jul. 31, 2012

(54) POSITION DETECTION SYSTEM FOR THE CONTACTLESS INTERFEROMETRIC DETECTION OF A LOCATION OF A TARGET OBJECT AND SCANNING SYSTEM EQUIPPED WITH THE SAME

(75) Inventor: Alexander Knüttel, Birkenau (DE)

(73) Assignee: ISIS Sentronics GmbH, Mannheim (DE)

( * ) Notice: Subject to any disclaimer, the term of this patent is extended or adjusted under 35 U.S.C. 154(b) by 387 days.

(21) Appl. No.: 12/448,690

(22) PCT Filed: Dec. 5, 2007

(86) PCT No.: PCT/EP2007/010541
§ 371 (c)(1),
(2), (4) Date: Jun. 30, 2009

(87) PCT Pub. No.: WO2008/080490
PCT Pub. Date: Jul. 10, 2008

(65) Prior Publication Data
US 2010/0039653 A1 Feb. 18, 2010

(30) Foreign Application Priority Data
Jan. 2, 2007 (EP) .................................. 07000003

(51) Int. Cl.
*G01B 11/02* (2006.01)
(52) U.S. Cl. ....................................................... 356/498
(58) Field of Classification Search .................. 356/482, 356/486, 487, 493, 498, 501
See application file for complete search history.

(56) References Cited

U.S. PATENT DOCUMENTS

| 4,303,341 A * | 12/1981 | Kleinknecht et al. ......... 356/636 |
| 5,172,185 A * | 12/1992 | Leuchs et al. .................. 356/482 |
| 5,229,832 A * | 7/1993 | Gaynor .......................... 356/482 |
| 5,757,505 A * | 5/1998 | Mizutani ....................... 356/400 |
| 5,841,030 A * | 11/1998 | Honsberg et al. ................ 73/579 |
| 5,933,236 A * | 8/1999 | Sommargren ................. 356/513 |
| 6,134,507 A | 10/2000 | Markey et al. |
| 6,667,798 B1 | 12/2003 | Markendorf et al. |
| 6,675,122 B1 | 1/2004 | Markendorf et al. |
| 6,784,977 B2 * | 8/2004 | von Bunau et al. ............. 355/67 |

(Continued)

FOREIGN PATENT DOCUMENTS
WO WO 01/09643 A1 2/2001
(Continued)

OTHER PUBLICATIONS

Bernard C. Jiang, J.T. Black, R. Duraisamy, "A Review of Recent Developments in Robot Metrology", 8287 Journal of Manufacturing Systems, 7 (1988) No. 4, Dearborn, Michigan, USA.

*Primary Examiner* — Tarifur Chowdhury
*Assistant Examiner* — Jonathan Hansen
(74) *Attorney, Agent, or Firm* — Walter A. Hackler

(57) ABSTRACT

The invention relates to a position detection system for the contactless interferometric detection of the location of a target object. A target object unit comprises a reference light transmitter, which is configured such that it transmits a reference light beam having curved light wave fronts. The target object unit comprises at least one detector array having a plurality of detector pixels, which is fixed to the target object unit such that the reference light beam of the reference light transmitter impinges on the same.

12 Claims, 2 Drawing Sheets

U.S. PATENT DOCUMENTS

| | | | |
|---|---|---|---|
| 7,423,765 B2 * | 9/2008 | Tschischgale et al. | 356/513 |
| 7,433,052 B2 * | 10/2008 | Tobiason et al. | 356/510 |
| 7,733,501 B2 * | 6/2010 | Tschischgale et al. | 356/513 |
| 7,920,275 B2 * | 4/2011 | Tschischgale et al. | 356/513 |
| 2005/0190371 A1 | 9/2005 | Knüttel | |

FOREIGN PATENT DOCUMENTS

| | | |
|---|---|---|
| WO | WO 2005/026772 A2 | 3/2005 |
| WO | WO 2005/088241 A1 | 9/2005 |
| WO | WO 2007/079837 A1 | 7/2007 |

* cited by examiner

POSITION DETECTION SYSTEM FOR THE CONTACTLESS INTERFEROMETRIC DETECTION OF A LOCATION OF A TARGET OBJECT AND SCANNING SYSTEM EQUIPPED WITH THE SAME

The invention relates to a position detection system for the contactless interferometric detection of the position in space of a target object, and a scanning system incorporating same.

In many fields of use, the problem arises to determine the location of a target object. The target object can be, in particular, a part that is moved in any manner or moves by itself. Examples are components of a production or measuring machine.

The invention focuses in particular on applications in which a detection of a location is required with accuracy in the range of, or even better than 1 µm (sub-µ range). In this field, primarily so-called laser tracking systems are used, by means of which the desired distance information is determined interferometrically. Such systems have a target object unit which is in a fixed position relative to the target object and to which a retroreflector is fixed. The laser tracking system also comprises a measuring light transmitter unit with a measuring light transmitter, by means of which laser light is radiated onto the retroreflector of the target object unit. The retroreflector is configured in such a manner that it reflects the measuring light beam back to the light source.

The measuring light transmitter unit comprises an interferometer arrangement and a detector which, due to the interference of the measuring light beam with a reference light beam, generates interferometric measuring signals, from which interferometric measuring data are derived. These interferometric measuring data allow to derive with extremely high accuracy distance information about the distance (more precisely, about the change of the distance) between the retroreflector and the measuring light transmitter unit. This distance information is used for the determination of the desired location of the target object. In most cases the information is combined with angle information concerning the solid angle at which the retroreflector is located relative to the measuring light transmitter unit.

Such laser tracking systems are described, for example, in the following publications:
(1) WO 2005/026772
(2) U.S. Pat. No. 6,667,798 B1
(3) WO 01/09643
(4) U.S. Pat. No. 6,675,122 B1

A disadvantage of known laser tracking system is their complex construction. In particular, the extremely precise tracking of the measuring light beam, corresponding to the movements of the target object, requires a complex mechanical design.

On this basis, the invention is based on the technical problem to provide a position detection system which requires less expense, in particular with respect to highly precise, movable parts, but achieves an accuracy that is comparable to, or better than, a laser tracking system.

SUMMARY OF THE INVENTION

This problem is solved according to the invention by means of a position detection system for the contactless interferometric detection of the location of a target object, with a target object unit, and with a measuring light transmitter unit having at least one measuring light transmitter from which a measuring light beam with coherent light is radiated onto the target object unit, wherein the location of the target object unit is determined by means of interferometric measuring data obtained from interference signals which are generated by a detector due to the interference of the measuring light beam with a reference light beam which is coherent with the measuring light beam, characterized in that the target object unit comprises a reference light transmitter which is configured in such a manner that it transmits a reference light beam having curved light wave fronts, the target object unit comprises at least one detector array having a plurality of detector pixels, the detector array being fixed to the target object unit in such a manner that the reference light beam of the reference light transmitter falls thereon, wherein the wave fronts of the measuring light beam impinge onto the detector array of the target object unit with a curvature which is less than the curvature of the wave fronts of the reference light beam, the wave fronts of the measuring light beam and of the reference light beam impinge only onto a portion of the detector pixels of the detector array with a sufficiently parallel orientation to allow the generation of an interference signal in the detector pixel, interference signals of at least one interference-signal-generating detector pixel of the detector array are evaluated to determine distance information about changes of the distance between the respective detector pixel and the measuring light transmitter, and the location of the target object relative to the measuring light transmitter unit is determined using this distance information.

The target object unit can be a part of the target object or can be a unit fastened thereto (in any case in a defined location relative to the target object). Unlike known tracking systems, the unit is not just a passive reflector, but an active system component comprising a reference light transmitter and at least two detector arrays, the detector pixels of which can generate interferometric measuring signals when appropriate geometrical conditions (to be explained hereafter) are met. To ensure coherence of the measuring light beam and the reference light beam, which is required for the interference, both light beams are derived by means of beam splitting from the same laser light source and—advantageously by means of flexible light conducting cables—are conveyed, on the one hand, to the light transmitter unit and, on the other hand, to the target object unit.

By means of the invention inter alia the following advantages are achieved:

A precise tracking of the measuring light beam is not required. In fact, it is sufficient when the measuring light beam is roughly oriented towards the target object unit so that it impinges with a sufficient intensity onto its the detector arrays. Therefore, the detection of the position normally does not require mechanical movements. Even if the direction of the measuring light beam has to be changed due a larger range of movements of the target object, this movement can be realized in a simple and cost-effective manner, because of the low precision requirements.

While in known laser tracking systems, dirt contamination of the retroreflector causes a limitation of measuring accuracy, comparable problems do not exist for the invention.

A further problem of the known laser tracking systems arises because their measuring accuracy is affected by changes of the angle of incidence onto the retroreflector. This is another limitation of the measuring accuracy which is eliminated by the present invention.

In known tracking systems, the precision of the distance information is also affected by the fact that the measuring light travels twice along the light path between the transmitter and the receiver. Therefore certain measuring errors, for example caused by vibrations of the system components, contribute twice to the total error. In the invention, however, the measuring light travels the light path between the measuring light transmitter unit and the target object unit only once.

The invention allows to determine not only the position of the target object unit (and hence of the target object) with extremely high speed, but also their orientation in space.

In summary, an improved technical performance is achieved with reduced expenditure.

As explained, the position detection system can be used in different fields of use, in particular in production and measuring technology. Such fields of use are mentioned in the above quoted documents (1) to (4). A further example is shown in (5) U.S. Pat. No. 6,134,507.

According to this document, a laser tracker is used to calibrate the position of so-called non-contact sensors. Meant here are optical systems which allow to detect characteristic structures of the manufactured object in an automated manufacturing line (for example in the automobile production) to allow the precisely-fitting mounting of further parts to a partially finished object. Also in such a case, a position detection system can be used advantageously instead of the conventional laser tracker. A further interesting field of use are mini-actuatorical gripper systems as used for extremely precise movement of elements in research or production processes.

A particularly important field of use of the invention is the scanning of the surface of an object.

The term "scan" is generally to be understood here in such a sense that it refers to any method in which location information about a plurality of measuring points on a surface (hereafter designated as "surface scan information") is obtained to detect the position and the shape of the surface in space. This concerns in particular not only the determination of the exact dimensions of an object ("dimensional inspection"), but also the structural characteristics of the surface, for example, its roughness.

For surface scanning, mainly coordinate measuring machines are used. They comprise a positioning device with a multi-dimensional, highly precise drive, and a scanning sensor that is moved by the positioning device relative to the object to be inspected, whereby the surface of the object is scanned by the scanning sensor. As scanning sensors, mainly mechanical scanners are used, which contact the object to be measured with a thin tip or a small ball, this contact being detected with electronic means. A very high accuracy up to the sub-µm range can thereby be achieved. To obtain the desired surface scan information, correspondingly precise location information with respect to the position of the sensor is required. To ensure this, the coordinate measuring machine must be constructed extremely precisely. This requires a high expense. Moreover, the mechanical scanning involves significant disadvantages because, on the one hand, the scanning speed is limited and because, on the other hand, in case of sensitive and elastic surfaces, damage or measurement deviations are unavoidable.

On this basis, the invention also refers to an improved scanning system for scanning the surface of an object, wherein the system comprises a scanning sensor and a positioning device, by means of which a scanning sensor fastened to the positioning device can be moved to different desired positions relative to an object, the surface of which is to be scanned. Here, a very high accuracy is achieved with a reduced constructional expenditure by using a position detection system according to the present invention, wherein the target object unit of the position detection system is positioned in a defined location with respect to the scanning sensor (preferably rigidly fastened on the same) so that by detection of the location of the target object unit, sensor position information is obtained. For determining the desired surface scan information, the sensor position information obtained by means of the position detection system is combined with the sensor scan information.

Preferably, a positioning robot is used as positioning device for the surface scanning. It has a multi-dimensionally moveable robot arm. The scanning sensor and the target object unit are fixed to the robot arm. A scanning system, in which a positioning robot is used, is described in DE 102004039760 A1. Here a spherical housing is attached to the distal end of the robot arm. It forms on the one hand, a scanning tip, by means of which a surface is mechanically scanned. On the other hand, it comprises a retroreflector, the position of which can be determined by means of a laser tracking system. The aim of this design is to achieve an accuracy in the sub-µm range. In the context of the present invention, the advantages are utilized which result from the use of a positioning robot (wide operating range, extensive degrees of freedom of motion, which allow the tracking of very complicated surfaces; low cost compared to a coordinate measuring machine). At the same time, a significantly higher accuracy is achieved compared to the DE 102004039760 A1, ranging down to the sub-µm range.

Preferably, in the context of the surface scanning system according to the invention, a scanning sensor is used which operates contactless. Preferred design features of suitable scanning sensors are described in US2005/0190371 A1, WO2005/088241 A1, and in the international patent application PCT/EP 2006/011586. The content of these documents is incorporated by way of reference into the present patent application. By combining the design features of scanning sensors described therein with the scanning system described herein, scanning even of very complicated surfaces is possible with highest accuracy, in a fast manner and with relatively low expenditure.

BRIEF DESCRIPTION OF THE DRAWINGS

The invention is described hereafter in more detail by means of exemplary embodiments shown in the Figures. The features described can be used individually or in combination to provide preferred embodiments of the invention. In the Figures.

DETAILED DESCRIPTION

Figure 1:
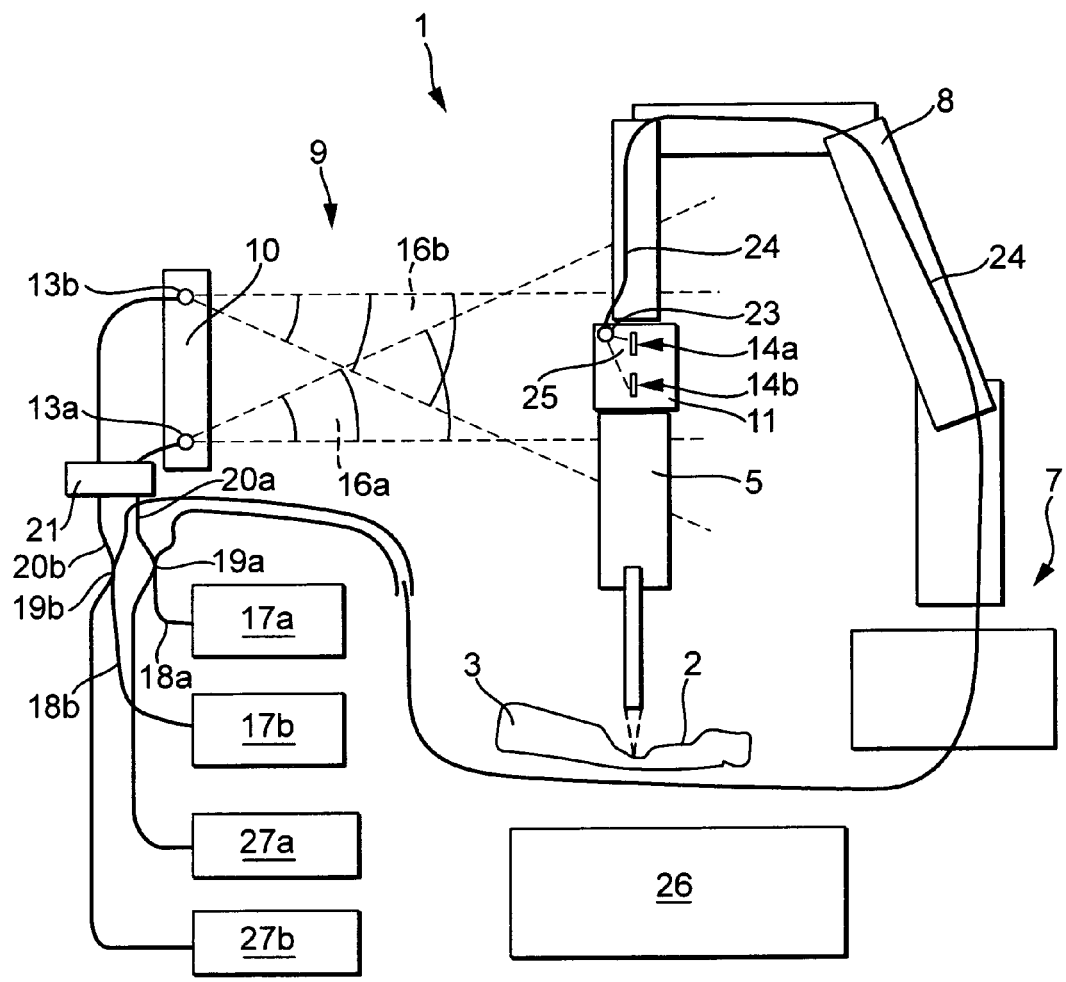
FIG. 1 shows a schematic side view, partially as a block diagram, of a scanning system according to the invention, comprising a positioning robot and a scanning sensor, the position of which is detected by means of position detection system according to the invention.

FIG. 1 shows a scanning system 1 for scanning the surface 2 of an object 3. The scanning system 1 consists of a contactless operating scanning sensor 5 and of a positioning robot 7 with a multi-dimensionally moveable robot arm 8, the positioning robot 7 serving as the positioning device 6 for the scanning sensor.

By means of the positioning robot 7, the scanning sensor 5 can be guided across the surface 2 of the object 3 in such a manner that it scans (preferably optically) the surface 2, Thereby changes of the distance between the scanning sensor 5 and the surface can be detected with high accuracy. Suitable scanning sensors and positioning robots—except for the particularities described herein—are known. In this respect, reference can be made inter alia to the documents mentioned above.

To obtain the desired surface scan information with respect to the surface 2, it is necessary to detect, in addition to the scan information provided by the scanning sensor, exactly the location of the same. For this purpose, a position detection system is used, which comprises, as two separate components, a measuring light transmitter unit 10 and a target object unit 11 which is rigidly coupled with the measuring sensor 5. With respect to the position detection system, the sensor 5 forms a target object, the position of which is detected by the position detection system.

In the illustrated case, the measuring light transmitter unit 10 has two light transmitters 13*a*, 13*b*, and the target object unit 11 has two detector arrays 14*a*, 14*b*, each of which—as will be explained in more detail—consists of a plurality of light-sensitive detector pixels. The number of light transmitters 13 and of detector arrays 14 should preferably correspond to the dimensionality of the position detection problem. When the detection of the position is a one-dimensional problem (for example, because the target object is moveable only along an exactly defined path and hence a complete position information about the target object can be obtained by determining the distance between the measuring light transmitter unit and the target object unit) one light transmitter and one detector array are sufficient. Particularly suitable is the invention, however, for multi-dimensional position detection or scanning, respectively, wherein the light transmitter unit comprises at least two, preferably at least three, light transmitters, and the target object unit comprises at least two, preferably at least three, detector arrays.

The minimum number of light transmitters and also the minimum number of detector arrays preferably correspond to the dimensionality of the problem. Thus, for a two-dimensional problem, the number is at least two, respectively, and for a three-dimensional problem, the number is at least three, respectively. A number of light transmitters and/or detector arrays that is higher than the corresponding dimensionality of the problem is not necessary, but can possibly be advantageous to achieve, by means of redundancy, a particularly high robustness against disturbing factors.

The plurality of detector arrays can be provided, for example, by means of a corresponding plurality of separate electronic components, such as CCD chips. However, it is, in principle, also possible to provide a plurality of detector arrays on a single component with an appropriately large area. In this case a respective partial quantity of the pixels forms the respective active detector array. Each detector array has preferably at least one row of detector pixels extending along a line, this line preferably being straight.

The measuring light transmitters 13*a*, 13*b* each radiate coherent light towards the target object unit 11 in such a manner that each of their measuring light beams 16*a*, 16*b* impinges on each of the detector arrays 14. Laser light sources 17*a*, 17*b* are used as light source for the coherent measuring light. From these the measuring light is conveyed via optical fibers 18*a*, 18*b*, optocouplers 19*a*, 19*b*, and further optical fibers 20*a*, 20*b* to a phase modulator unit 21, and from there to transmitting points at the end of the optical fibers, which transmitting points form the light transmitters 13*a*, 13*b*.

The target object unit 11 comprises a reference light transmitter 23, which, as well as the measuring light transmitters 13*a* and 13*b*, is formed by light transmitting points at the end of a fiber optic cable 24. Through the reference light fiber optic cable 24, reference light, which is branched off in the optocouplers 19*a*, 19*b* from the light of the laser light sources 17*a*, 17*b*, is conveyed to the reference light transmitter 23. From the reference light transmitter 23, a reference light beam 25 is radiated in such a manner that it impinges onto each detector array 14*a*, 14*b* of the target object unit 11.

If, with respect to the superimposed wave fronts of the measuring light beams 16*a*, 16*b* and the reference light beam 25, certain conditions are met, which will be explained later in more detail, one of the pixels or a plurality of pixels forming the detector arrays 14*a*, 14*b* generate interference signals in each of the arrays. Distance information about changes of the distance between the respective detector pixel generating an interference signal and the measuring light transmitter 13*a* or 13*b* (and hence the measuring light transmitter unit 10), respectively, can be determined from these interference signals. The processing of the interference signals for determining the distance information takes place in a known manner by means of technologies which are also used in laser tracking systems. Preferably, the light of the measuring light beams 16*a*, 16*b* is frequency-modulated by means of the phase modulator unit 21. The light of the measuring light beams 16*a*, 16*b* is preferably modulated differently to allow separation of the generated interference signals. This differentiation modulation can be a phase modulation as well as an amplitude modulation. The signal processing takes place by means of a central unit 26, which is shown in FIG. 1 symbolically only, to which the measuring data can be transferred via not-shown data lines, or can be transferred wireless. The central unit 26 generates also the control signals for the active components of the system (laser light sources 17, phase modulator unit 21, positioning robot 7, scanning sensor 5).

FIG. 1 shows a two-dimensional illustration for a two-dimensional problem with two light transmitters and two detector arrays. By determination of the distances between (at least) one interference-signal-generating detector pixel, respectively, of each array and each light transmitter, the position of the target object unit, and hence of the target object, including its orientation in space (for example, expressed by four space coordinates x, y, tilting, and inclining) can be completely determined. In case of a three-dimensional problem, as explained above, preferably at least three light transmitters and three detector arrays are provided. Thereby, all six space coordinates (x, y, z, tilting, inclining, rolling), which fully describe the position and the orientation of the target object in space, can be determined.

A technical problem results from the fact that in the shown position detection system 9, the light path from the optocouplers 19*a*, 19*b*, acting as beam dividers, to the reference light transmitter 23 is very long. Due to the movements of the positioning robot 7, (minor) dynamic elongations of the reference fiber optic cable 24 can occur. In case of very high requirements for the accuracy of the determined distance information, a compensation of the reference light path's length variation resulting from such dynamic elongations is required. This can be achieved by means of a partial feedback of the reference light.

For this purpose, the reference fiber optic cable 24 is formed in the area of the reference light transmitter 23 in such a manner that a portion of the reference light is reflected back into the fiber optic cable 24. Also the fiber optic cables 20a, 20b are in the area of the light transmitters 13a, 13b formed in such a manner that a portion of the measuring light is reflected back into said fiber optic cables. Both back-reflected light portions arrive through the optocouplers 19a, 19b in compensator units 27a, 27b, in which interference of the two light portions takes place. From the resulting interference signals, an information about dynamic length variations of the reference light path (fiber optic cable 24) compared to the measuring light path (fiber optic cables 20a, 20b) can be determined, which information is necessary for the compensation. Based on this information, errors caused by the dynamic elongation of the fiber optic cable (in particular of the long cable to the reference light transmitter) can be compensated.

Figure 2:
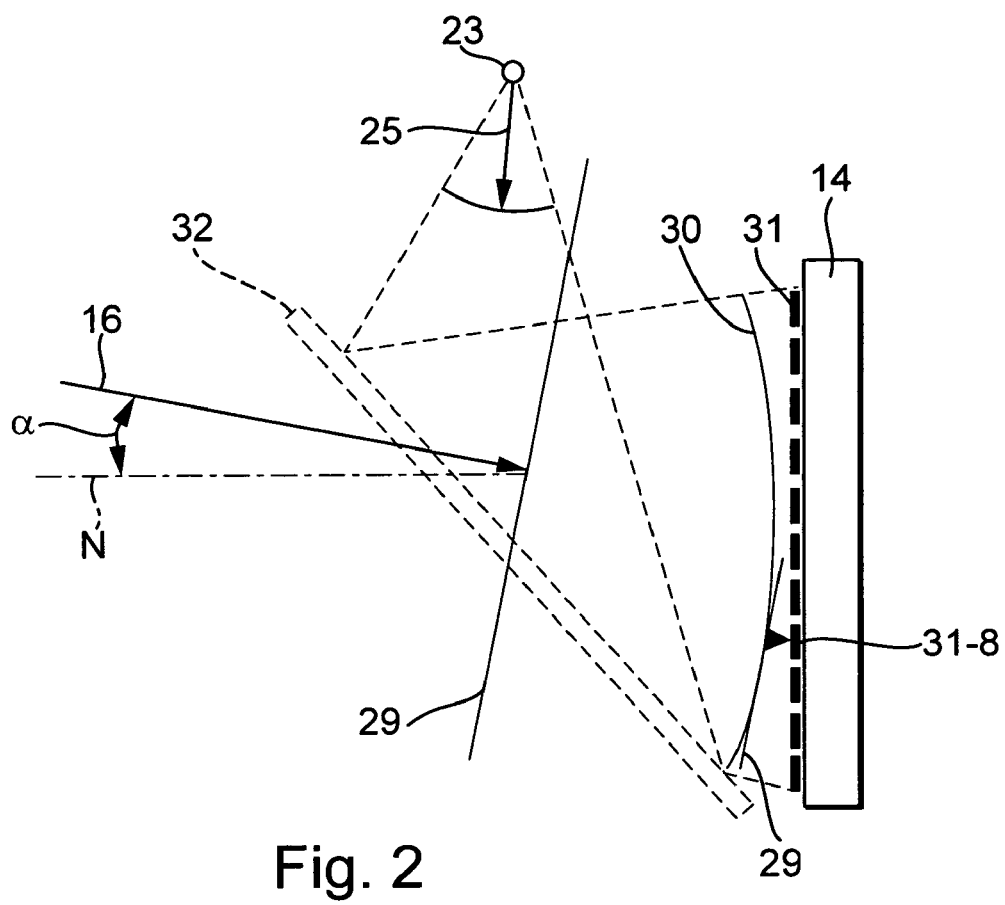
FIG. 2 shows a detailed view for illustrating the geometrical conditions which are essential in the context of the invention, with respect to the measuring light and the reference light.

Hereafter, with reference to FIG. 2, the geometrical conditions are explained which must be met to allow, without movable parts, generating of an interference signal, even if the angle of incidence of the measuring light beam varies over a wide angle range relative to the target object unit and hence to its detector arrays.

FIG. 2 shows a measuring light beam 16 which is incident with an angle $\alpha$ with respect to a normal N to the surface of the detector array 14. Due to the fact that the distance from the light transmitter 13 is much greater than the extension of the detector array 14, the wave fronts 29 of the measuring light beam 16 run approximately straight. In any case, their degree of curvature is significantly less than the curvature of the wave fronts 30 of the reference light beam 25, which is irradiated on a substantially shorter path from the reference light transmitter 23 via a semi-transparent mirror 32 onto the detector array 14.

A condition for allowing measurement of an interference signal is that the local wave fronts of the measuring light beam 16 and of the reference light beam 25 impinge sufficiently parallel onto a detector pixel 31 of the array 14. Exact information about permissible deviations from this parallelism requirement can not be provided, because the evaluability of the interference signals depends inter alia on the used measuring electronics. The formula $\alpha=\lambda/(2d)$ allows an approximate estimation. With a wave length of $\lambda=630$ nm and a diameter of the detector pixels of $d=10$ µm a permissible angle deviation of $\alpha=0.03$ rad or 1.7° is calculated on the basis of this equation.

Figure 3:
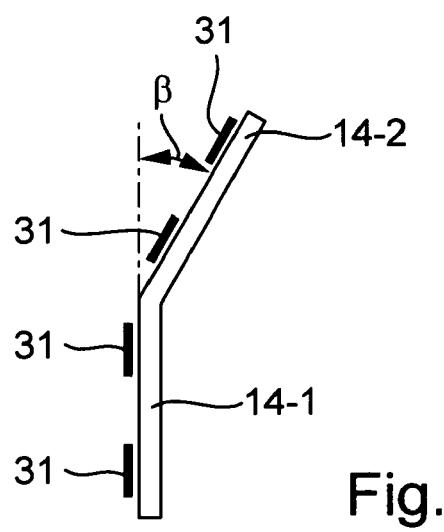
FIG. 3 shows a side view of an alternative embodiment of a detector array suitable for the invention.

The illustration in FIG. 2 shows that, due to the different curvatures of the wave fronts 29, 30, this condition is met only for one or few adjacent detector pixels 31 of the detector array 14. In FIG. 3, this applies to the eighth detector pixel of the array 14, which pixel is designated as 31-8.

Thereby, it is apparent that a greater range of the angle of incidence of the measuring light beam 16 can be captured without movable parts by complying with the explained geometrical conditions with respect to the positioning of the points (light transmitters) from which the measuring light beam and the reference light beam start, and with respect to the related curvature of the wave fronts of both beams in connection with a suitable detector array. The higher the degree of curvature of the wave fronts of the reference light beam 25 is, relative to the wave fronts of the measuring light beam 16, the greater are the evaluable angles $\alpha$ between the measuring light beam 16 and the normal N of the detector array 14. At the same time, the number of interfering adjacent pixels is reduced. The experimental evaluation of the invention has shown that the angle $\alpha$ for planar detector arrays (with detector pixels arranged in a common plane) is approximately ±45° up to maximal ±60°. This is sufficient for most cases of use. Should a greater range be necessary, the arrangement of a detector array shown in FIG. 3 can be selected in which different parts 14-1 and 14-2 of the array are oriented to each other at an angle $\beta$, wherein the angle $\beta$ is preferably at least 30°.

Numerous variations of the described invention are possible, wherein, inter alia, the following is to be considered:

Different electronic components are suited for making the detector array, provided that they comprise a plurality of light-sensitive elements which allow a location-resolved detection of light. Preferably, the light-sensitive elements (pixels) of the detector array extend along a line which preferably (but not necessarily) runs straight. In consideration of cost and function CCD detector arrays are in particular suitable.

The wavelength of the light used in the context of the invention does not have to be within the visible range. "Light" in the sense of the invention therefore designates electromagnetic waves adjacent to the visible range as well (towards IR as well as UV).

The curvature of the wave front of the measuring light beam and the reference light beam at the respective light transmitters is determined by the optical conditions existing there. With a point source of light spherical wave fronts are generated. However, by means of suitable output optics, differently (not spherically) curved wave fronts can also be generated which are suitable for the invention as long as the explained conditions with respect to the different curvatures, at impinging onto the detector arrays, are met.

The configuration shown in FIG. 1, in which the (coherent and hence suitable for interference) reference light, which corresponds to a plurality of light transmitters 13a, 13b, exits at the same (common) point (reference light transmitter 23), is advantageous for practical reasons, but is not necessary. It is also possible to provide a plurality of exit locations for the reference light (reference light transmitters) at the target object unit.

As explained, the position detection system can in principle be operated without moveable parts. However, it is a requirement that the measuring light impinges with a sufficient intensity onto the detector arrays of the target object unit. Therefore, it has to be radiated sufficiently wide. If, for intensity reasons, a higher concentration of the measuring light is required, or in case of very large movement ranges of the target object, a swiveling device can be provided which directs the measuring light onto the target object unit. However, in contrast to laser tracker systems, a rough orientation of the measuring light is sufficient which can be achieved in a cost-effective manner.

What is claimed is:

1. Position detection system for contactless interferometic detection of a location of a target object, comprising
a target object unit, and
a measuring light transmitter unit with at least one measuring light transmitter from which a measuring light beam with coherent light is radiated onto the target object unit;
wherein the location of the target object unit is determined using interferometric measuring data obtained from interference signals which are generated by a detector due to the interference of the measuring light beam with a reference light beam, which is coherent with the measuring light beam;
the target object unit comprises a reference light transmitter, which is configured for transmitting the reference light beam with curved light wave fronts;

the target object unit comprises at least one detector array having a plurality of detector pixels, the detector array being fixed to the target object unit for impinging the reference light beam of the reference light transmitter on the detection array, wherein the wave fronts of the measuring light beam impinge onto the detector array of the target object unit with a curvature which is less than the curvature of the wave fronts of the reference light beam;

the wave fronts of the measuring light beam and of the reference light beam impinge only onto a portion of the detector pixels of the detector array with a sufficiently parallel orientation to allow the generation of an interference signal in the detector pixel;

interference signals of at least one interference-signal-generating detector pixel of the detector array are evaluated to determine distance information about changes of the distance between the respective detector pixel and the measuring light transmitter, and the location of the target object relative to the measuring light transmitter unit is determined using this distance information.

2. Position detection system according to claim 1, wherein the detector array comprises a row of detector pixels, the pixels extending along a line.

3. Position detection system according to claim 1, further comprising a phase modulator for modulating the measuring light beam.

4. Position detection system according to claim 1, wherein the target object unit comprises a plurality of at least three detector arrays each with a plurality of detector pixels, the plurality of detector arrays being fixed to the target object unit for impinging the reference light beam of the reference light transmitter on the detection arrays, wherein the wave fronts of the at least one measuring light beam and of the reference light beam impinge only on a portion of the detector pixels of each detector array with a sufficiently parallel orientation to allow the generation of an interference signal in the detector pixel, and the location of the target object relative to the measuring light transmitter unit is determined using distance information which is obtained by evaluating the interference signals of at least one interference-signal-generating detector pixel of each of the plurality of detector arrays.

5. Position detection system according to claim 1, wherein the measuring light transmitter unit has a plurality of at least three measuring light transmitters, each adapted for radiating a measuring light beam onto the target object unit.

6. Position detection system according to claim 5, further comprising a modulator for differently modulating the plurality of measuring light beams of the plurality of measuring light transmitters.

7. The position detection system according to claim 2 wherein the pixels extend along a straight line.

8. Scanning system for scanning a surface of an object to be scanned, the system comprising a position detection system for contactless interferometric detection of a target object, the position detection system comprising:

a target object unit;

a measuring light transmitter unit with at least one measuring light transmitter from which a measuring light beam with coherent light is radiated onto the target object unit;

wherein the location of the target object unit is determined using interferometric measuring data obtained from interference signals which are generated by a detector due to the interference of the measuring light beam with a reference light beam, which is coherent with the measuring light beam;

the target object unit comprises a reference light transmitter, which is configured for transmitting the reference light beam with curved light wave fronts;

the target object unit comprises at least one detector array having a plurality of detector pixels, the detector array being fixed to the target object unit for impinging the reference light beam of the reference light transmitter on the detection array, wherein the wave fronts of the measuring light beam impinge onto the detector array of the target object unit with a curvature which is less than the curvature of the wave fronts of the reference light beam;

the wave fronts of the measuring light beam and of the reference light beam impinge only onto a portion of the detector pixels of the detector array with a sufficiently parallel orientation to allow the generation of an interference signal in the detector pixel;

interference signals of at least one interference-signal-generating detector pixel of the detector array are evaluated to determine distance information about changes of the distance between the respective detector pixel and the measuring light transmitter, and the location of the target object relative to the measuring light transmitter unit is determined using this distance information;

the scanning further comprising:

a scanning sensor is attached to the target object unit of the position detection system such that by detection of said position of the target object unit the position of the scanning sensor is also determined as sensor position information;

a positioning device for moving the scanning sensor, fixed to the positioning device, into different desired positions relative to the object to be scanned; and the sensor position information is processed together with sensor scan information generated by the scanning sensor for generating desired surface scan information.

9. Position detection system according to claim 8 wherein the target object unit comprises at least three detector arrays.

10. Position detection system according to claim 9 wherein the measuring light transmitter unit has at least three measuring light transmitters.

11. Scanning system according to claim 8, wherein the positioning device comprises a positioning robot with a multi-dimensionally movable robot arm, and wherein the scanning sensor and the target object unit are fixed to the robot arm.

12. Scanning system according to claim 11 wherein the scanning sensor operates contactless.

* * * * *